(12) United States Patent
Gallagher et al.

(10) Patent No.: US 6,317,521 B1
(45) Date of Patent: Nov. 13, 2001

(54) METHOD FOR PRESERVING IMAGE DETAIL WHEN ADJUSTING THE CONTRAST OF A DIGITAL IMAGE

(75) Inventors: Andrew Gallagher; Edward B. Gindele, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/163,645

(22) Filed: Sep. 30, 1998

Related U.S. Application Data
(60) Provisional application No. 60/091,848, filed on Jul. 6, 1998.

(51) Int. Cl.[7] ....................................................... G06K 9/36
(52) U.S. Cl. ............................................ 382/260; 382/261
(58) Field of Search ..................................... 382/260–269, 382/254, 274

(56) References Cited

U.S. PATENT DOCUMENTS

| | | | |
|---|---|---|---|
| 5,012,333 | 4/1991 | Lee et al. ................................ | 358/80 |
| 5,339,365 * | 8/1994 | Kawai et al. ........................... | 382/54 |
| 5,426,517 | 6/1995 | Schwartz ................................ | 358/520 |
| 5,454,044 | 9/1995 | Nakajima ............................... | 382/132 |
| 5,920,646 * | 8/1994 | Kamon .................................. | 382/173 |

FOREIGN PATENT DOCUMENTS 0 525 949 A2   2/1993   (EP) ................................ G06F/15/68

* cited by examiner

Primary Examiner—Thomas D. Lee
Assistant Examiner—Stephen Brinich
(74) Attorney, Agent, or Firm—David M. Woods

(57) ABSTRACT

A method for preserving detail when adjusting tone scale of a digital image channel, the method comprises receiving a digital image channel; providing a tone scale function for adjusting the tone scale of the digital image channel; spatial filtering the digital image with a spatial filter which varies with location in the digital image channel according to the control signal producing a space-variant spatial filtered version of the digital image channel; using the tone scale function and the space-variant spatial filtered version of the digital image channel to produce an enhanced digital image channel.

8 Claims, 6 Drawing Sheets

METHOD FOR PRESERVING IMAGE DETAIL WHEN ADJUSTING THE CONTRAST OF A DIGITAL IMAGE

CROSS REFERENCE TO RELATED APPLICATION

Reference is made to and priority claimed from U.S. Provisional Application Ser. No. 60/091,848, filed Jul. 06, 1998, entitled CITRUS FREQUENCY PROCESSING.

FIELD OF THE INVENTION

The invention relates generally to the field of digital image processing and, more particularly, to a method for preserving image detail when adjusting the contrast of a digital image.

BACKGROUND OF THE INVENTION

Existing methods for applying tone scales to digital color images include applying the tone scale to each of the color channels independently, applying the tone scale to the neutral channel and preserving the original pixel color difference signal, or applying the tone scale to just the low frequency image. These methods of tone scale application alter the sharpness and appearance of the color in processed images, and the latter can produce displeasing artifacts.

Traditional methods of applying a tone scale function to a digital color image modify the apparent sharpness of the image because the tone scale modifies the amplitudes of high frequency detail information. This phenomenon occurs when the tone scale function is applied to each of the color channels independently, or when the tone scale function is applied to the neutral channel and original pixel color difference signals are preserved.

In an effort to apply a tone scale function to a digital image without distorting the detail information, in U.S. Pat. No. 5,012,333 Lee et al. proposed separating the image into a high frequency and a low frequency image by using FIR filters. The tone scale function is then applied to only the low frequency image, and the high frequency image is added back to the tone scaled low frequency image.

Also, in U.S. Pat. No. 5,454,044 Nakajima suggests modifying the image contrast by the formula Sproc=Sorg+f(Sus).

The low frequency image (Sus) is passed through function f() which is a monotonically decreasing function. This signal is added to the original (Sorg) to create the processed image Sproc.

Both of these methods preserve the high frequencies of the image, but this may lead to the creation of unsharp mask type artifacts (overshoot and undershoot) in the neighborhood of large edges (characteristic of occlusion boundaries or dark shadows).

Consequently, a need exists for overcoming the above-described drawbacks. More specifically, a need exists for permitting the application of a tone scale function to a digital image to adjust the macro contrast of the image, preserves the high frequency detail information, and prevents artifacts in the neighborhood of large edges.

SUMMARY OF THE INVENTION

The present invention is directed to overcoming one or more of the problems set forth above. Briefly summarized, according to one aspect of the present invention, the invention resides in a method for adjusting tone scale of a digital image channel, the method comprising: (a) receiving a digital image channel; (b) providing a tone scale function for adjusting the tone scale of the digital image channel; (c) spatial filtering the digital image with a spatial filter which varies with location in the digital image channel according to the control signal producing a space-variant spatial filtered version of the digital image channel; (d) using the tone scale function and the space-valiant spatial filtered version of the digital image channel to produce an enhanced digital image channel.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of preserving edge detail while altering the contrast of a digital image.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
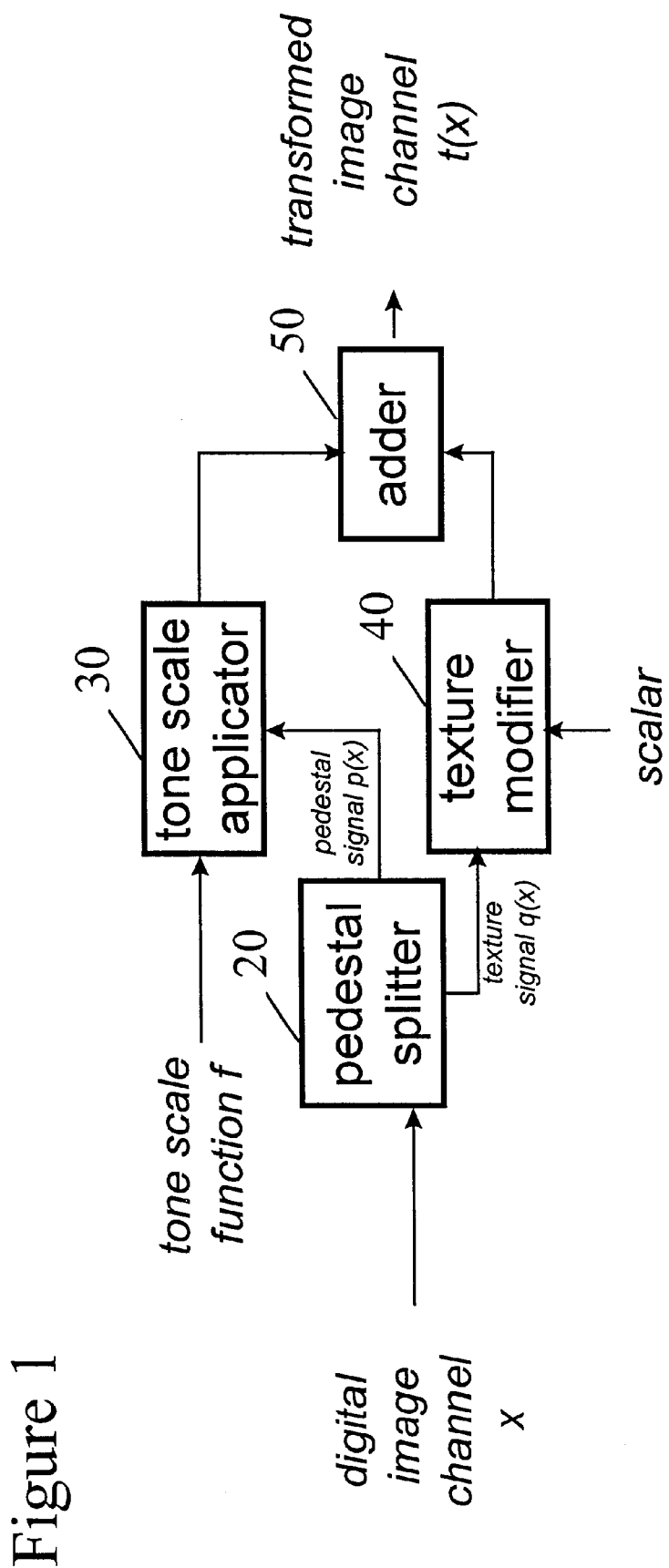
FIG. 1 is a block diagram illustrating an overview of the present invention.

Referring to FIG. 1, there is illustrated an overview of the present invention. It is instructive to note that the present invention utilizes a digital image which is typically a two-dimensional array of red, green, and blue pixel values, or a single monochrome pixel value corresponding to light intensities. In this regard, a digital representation of an image, typically in RGB color space consisting of separate red, green, and blue image channels, is transformed to a luminance-chrominance color space by a color space matrix transformation resulting in a luminance image channel and two chrominance image channels. It facilitates understanding to note that the present invention operates on only the luminance channel or individually on each chrominance channel, for example red, green and blue. This transformation into a luminance-chrominance color space is well known in the art. After the present invention performs its operations, the digital image is preferably transformed back into RGB color space by an inverse color space matrix transformation for permitting printing a hardcopy or displaying on an output device.

Figure 5:
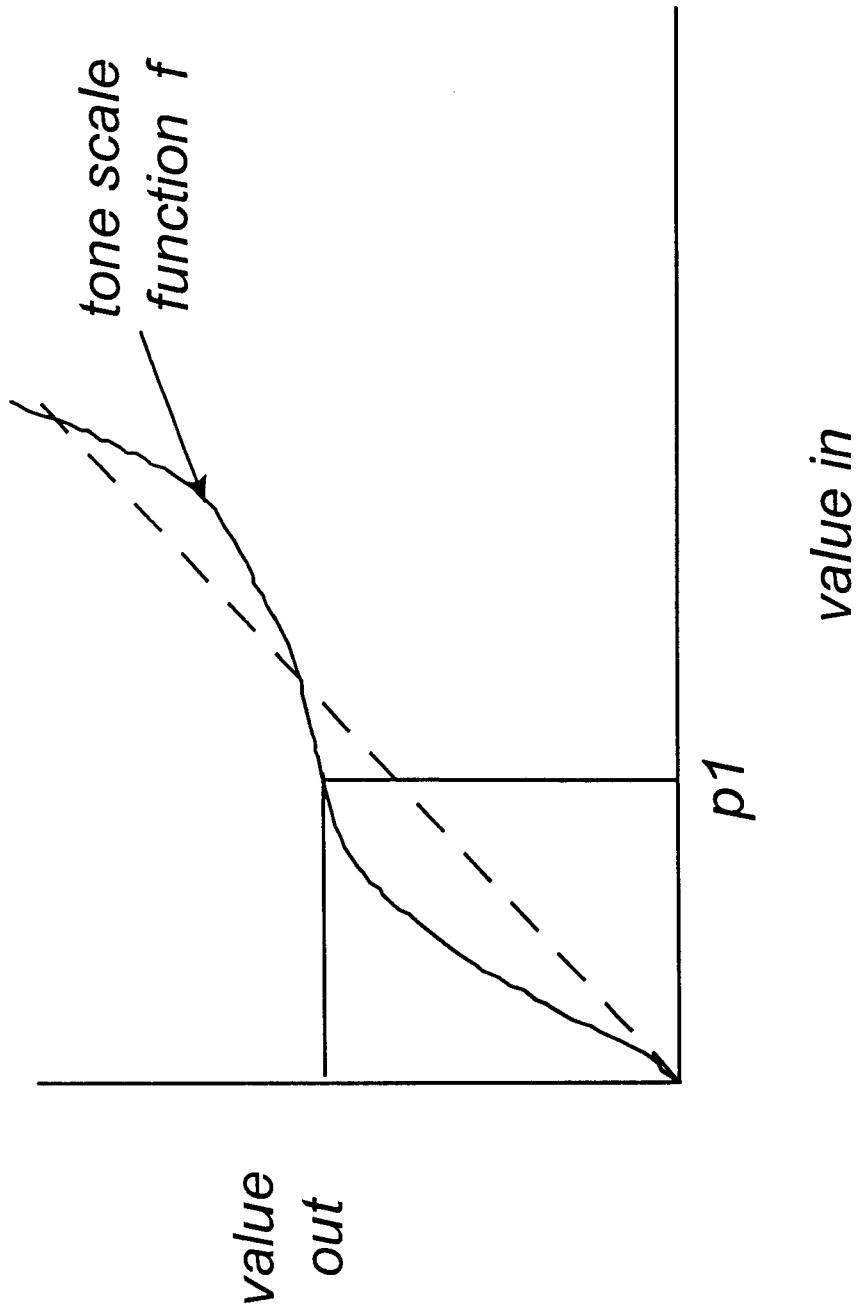
FIG. 5 is an example of a typical tone scale function.

The digital representation of the digital image channel is then divided two portions by a pedestal splitter 20—a pedestal signal and a texture signal, as will be described in detail below. A tone scale function is applied to the pedestal signal by a tone scale applicator 30 in order to change the characteristics of the image for image enhancement. The tone scale function may be applied for the purposes of altering the relative brightness or contrast of the digital image. A tone scale applicator 30 is implemented by application of a look up table (LUT) to an input signal, as is well known in the art. An example tone scale showing a 1 to 1 mapping of input values to output values is illustrated in FIG. 5. The texture signal may be amplified by the texture modifier 40 if desired, or altered in some other manner as those skilled in the art may desire. This texture modifier 40 may be a multiplication of the texture signal by a scaler constant. The modified texture signal and the modified pedestal signal are then summed together by an adder 50, forming a transformed image channel. The addition of two signals by an adder 50 is well known in the art, and will not be further discussed.

Figure 2:
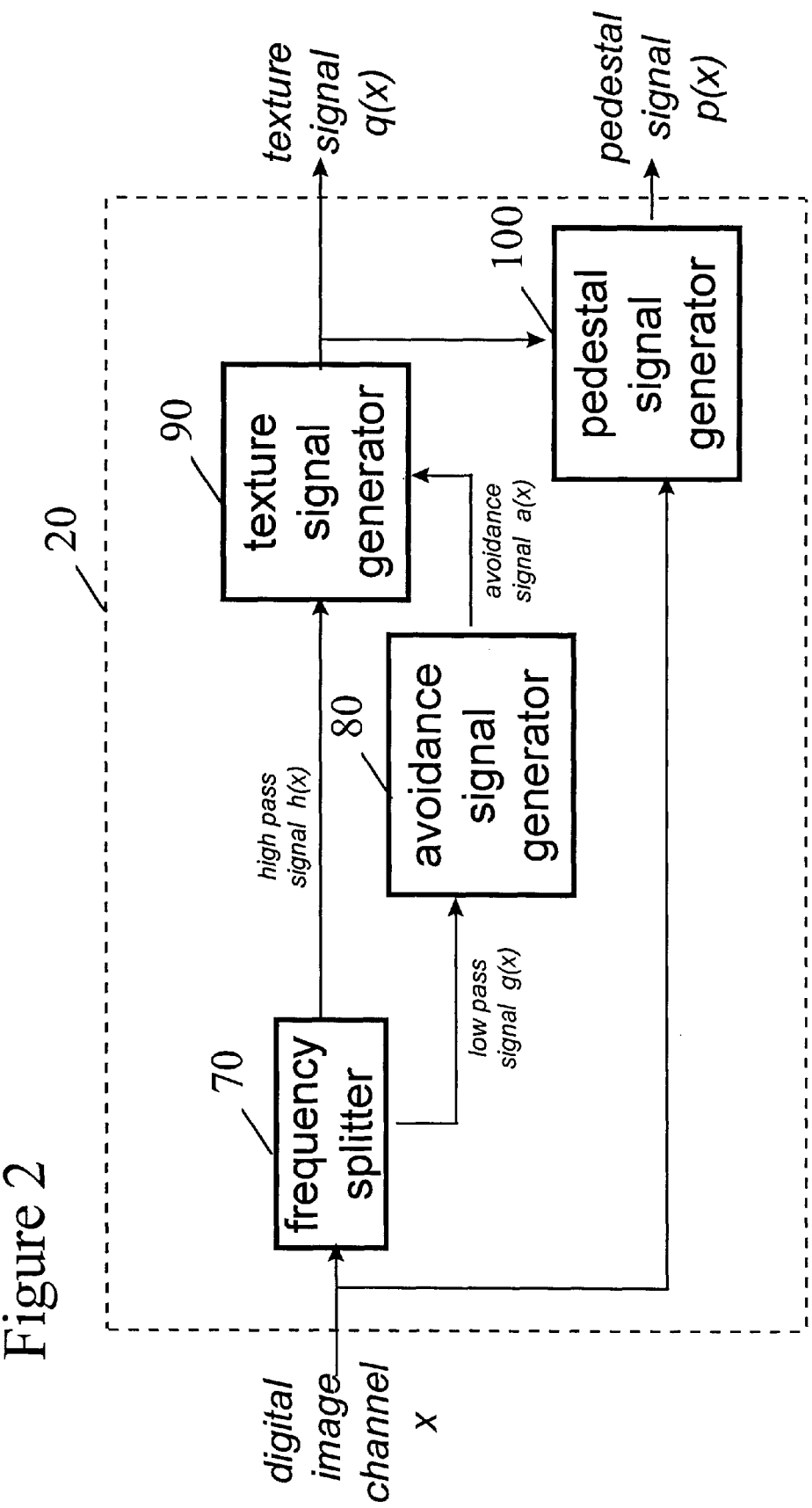
FIG. 2 is an exploded view of the pedestal splitter of FIG. 1.

Referring to FIG. 2, the digital image channel input into the pedestal splitter 20 is split into a high pass signal and a low pass signal by spatial filtering procedure 70 preferably with a Gaussian filter with a standard deviation (sigma) of 2.5 pixels. The preferred value of the standard deviation of the Gaussian filter may vary with image size. The value of 2.5 pixels for the sigma value was derived by optimizing the present invention with 1024 by 1536 pixel size images. This Gaussian filter is a two dimensional circularly symmetric low-pass filter whose filter coefficients may be derived by the following formula which is well known in the art:

$$G(i,j)=1/(sigma\ sqrt(2\pi))exp[-(i^2+j^2)/(2\ sigma^2)]$$

Where $G(i,j)$=the Gaussian filter coefficient at the $(i,j)^{th}$ pixel
Sigma=the standard deviation of the Gaussian filter (2.5)
$\pi$=the constant approximately 3.1415 . . .

The low-pass signal is input into an avoidance signal generator 80 for forming an avoidance signal, as will be described in detail below. A texture signal generator 90 receives both the high pass signal and the avoidance signal and both signals are multiplied therein for producing a texture signal.

The pedestal generator 100 receives the original luminance signal and the texture signal and subtracts the texture signal from the luminance signal, which produces a pedestal signal.

Figure 3:
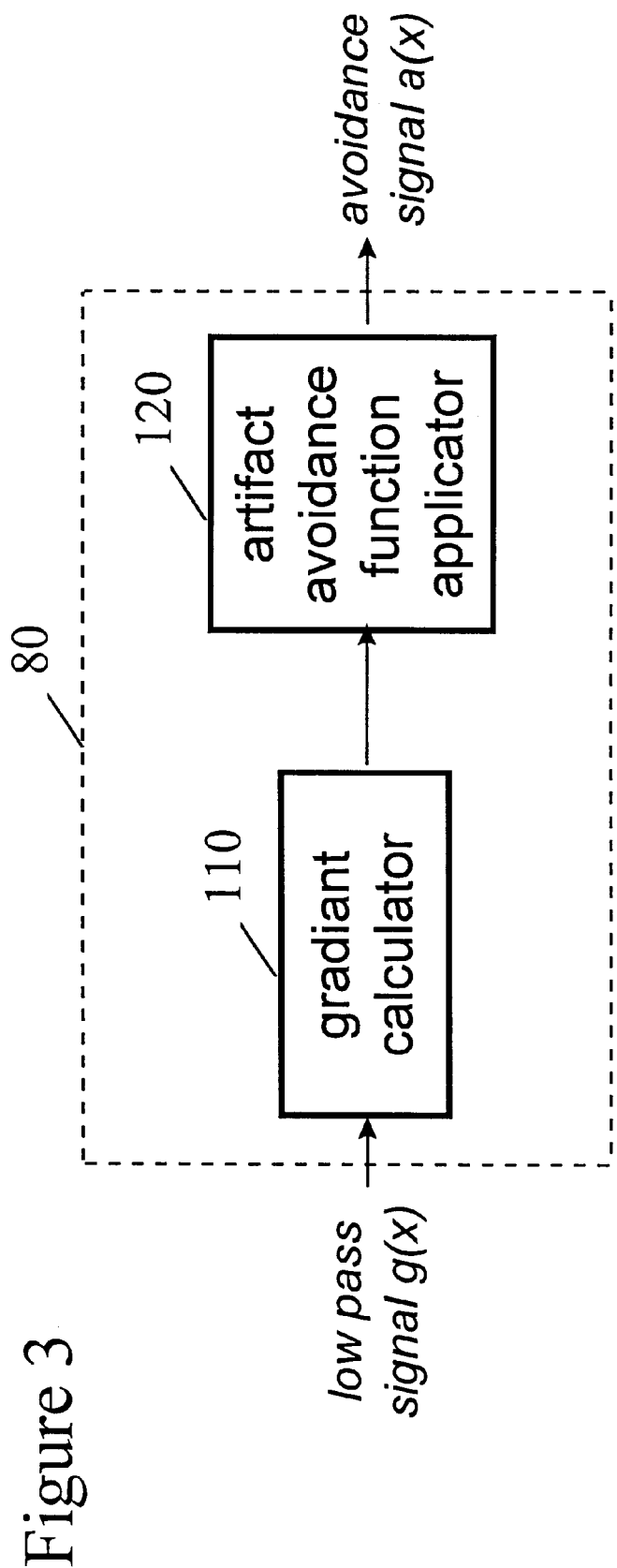
FIG. 3 is an exploded view of the avoidance signal generator of FIG. 2.

Referring to FIG. 3, there is illustrated an exploded block diagram of the avoidance signal generator 80. In this regard, the low pass signal is input into a non-directional squared gradient calculator 110 for producing a non-directional gradient signal. This calculation is performed by first calculating the difference between the pixel and its upper vertical neighbor, as well as the difference between the pixel and its horizontal neighbor to the right. The non-directional squared gradient is the sum of the squares of these two differences. The non-directional squared gradient signal is then mapped by an artifact avoidance function applicator 120 to produce an artifact avoidance signal as the output of the avoidance signal generator 80. This output signal of the avoidance signal generator 80 will from now on be referred to as $a(x)$.

Figure 4:
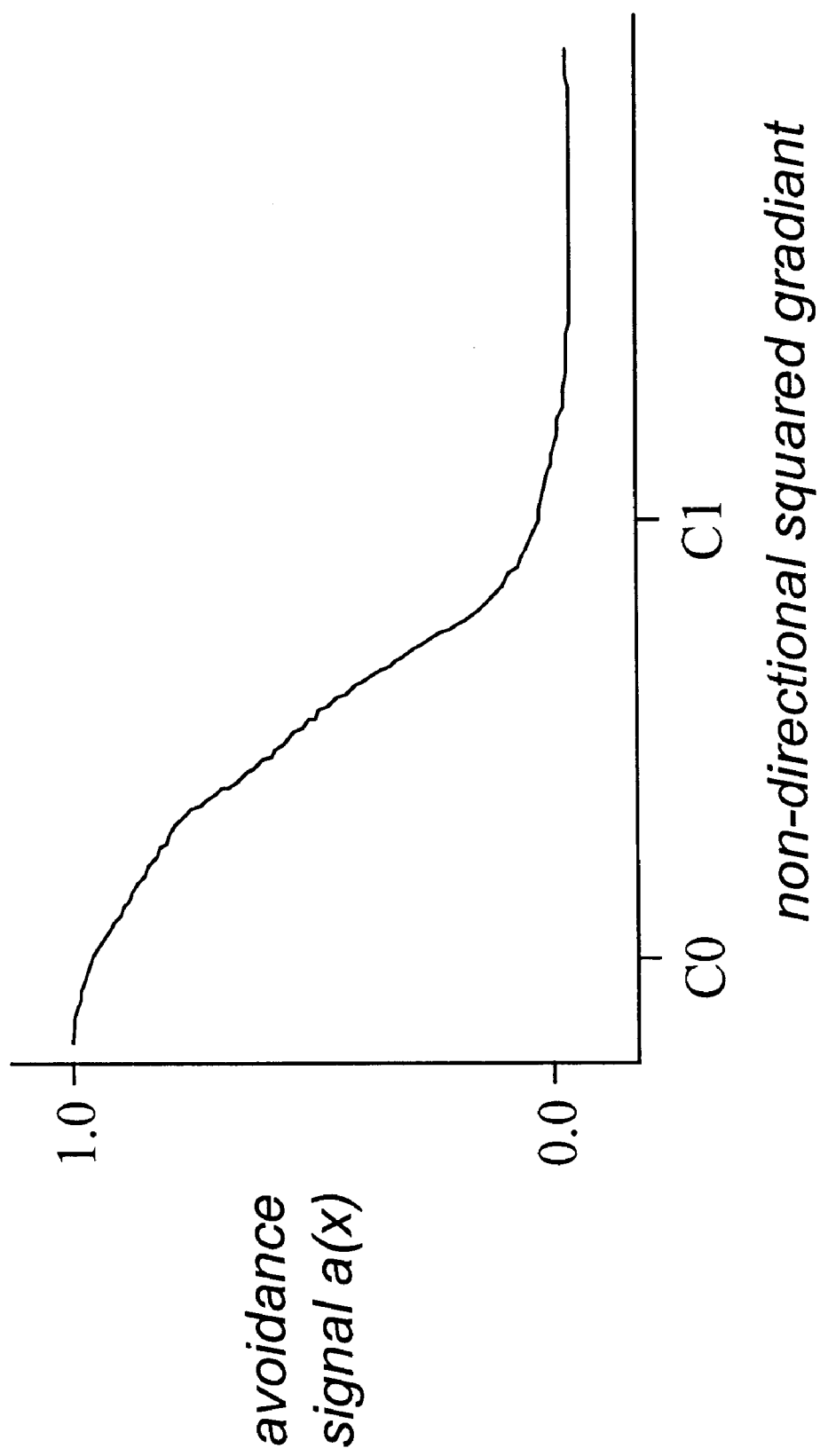
FIG. 4 is the artifact avoidance LUT.

Referring to FIG. 4, this mapping function is performed by passing the non-directional squared gradient signal, $ndg(x)$, through an artifact avoidance function avo formed in the following manner. The preferred embodiment of the present invention utilizes an artifact avoidance function defined by:

$$av(y)=(\tfrac{1}{2})(1+COS(\pi(y-Co)/(C_1-Co))$$

for $y>Co$ and $y<C_1$, $$av(y)=0$$

for $y>=C_1$ and $$av(y)=1$$

for $y<=Co$ where Co and $C_1$ are numerical constants.

The preferred values for Co and $C_1$ will vary according to the range of the input data. The input data range in the images used in the development of this preferred embodiment ranged from 0 to 4095. In this case, the preferred value for Co is 148, and the preferred value for $C_1$ is 1300. As an alternate method for constructing the artifact avoidance function is described in the following equation:

$$av(y)=1-sqrt((y-Co)/(C_1-Co))$$

$$av(y)=1-((y-Co)/(C_1-Co))$$

for $y>=Co$ and $y<=C_1$, $$av(y)=1$$

for $y<Co$, and $$av(y)=0$$

for $y>C_1$.

The artifact avoidance signal, $a(x)$, is generated by the artifact avoidance function applicator 120. This is accomplished by applying the artifact avoidance function $av()$, to the non-directional gradiant signal $ndg(x)$. The mathematical result is described by the equation:

$$a(x)=av(ndg(x)).$$

The artifact avoidance function is most efficiently implemented as a look-uptable (LUT).

A generalized linear spatial filter is described by the equation $$y_{ij}=\Sigma c_{mn}x_{mn}$$

where the $x_{mn}$ values represent local pixel values surrounding the $ij^{th}$ pixel and the $c_{mn}$ values represent numerical coefficients that do not depend on the pixel values $x_{mn}$. A non-linear spatial filter herein described shall be defined as a spatial filter which can not be described by the linear spatial filter equation. The output of applying a generalized control signal to an input signal bears a multiplicative relationship to the input signal. An example of applying a control signal is given by the equation:

$$y_{ij}=a_{ij}x_{ij}$$

where the $x_{ij}$ values represent the input signal $ij^{th}$ pixel values and the $a_{ij}$ values represent the $ij^{th}$ pixel values of the control signal. The result of applying a control signal to an input signal falls into the general category of a non-linear spatial filter if the control signal is derived from a spatial filtered version of the input signal. The avoidance signal $a(x)$ is an example of a control signal created from a spatially filtered version of the digital image channel. The texture signal $q(x)$ described in the preferred embodiment is an example of a non-linear spatial filter produced with the application of a control signal to the high-pass signal.

Figure 6:
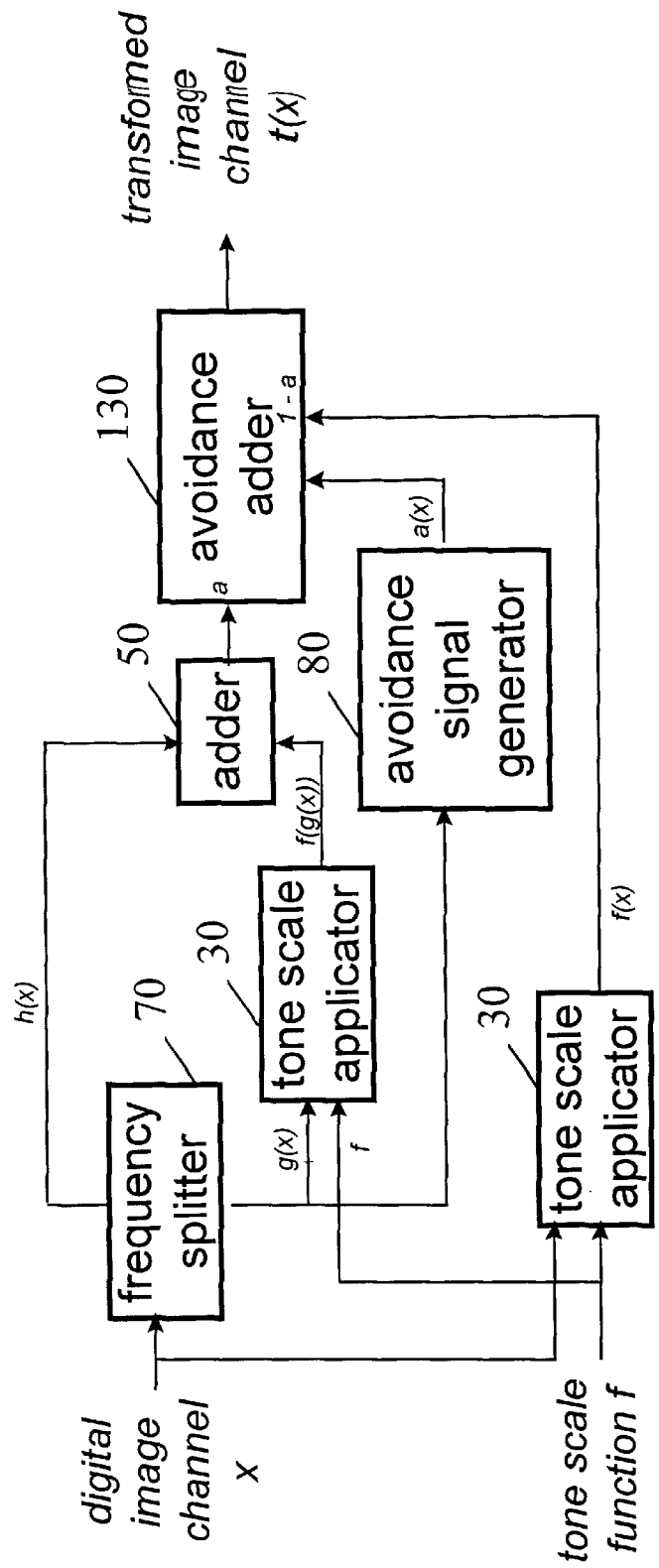
FIG. 6 is an alternative embodiment of the present invention.

Referring to FIG. 6, there is illustrated an alternative configuration of the present invention. In this configuration, the digital image signal is passed through a frequency splitter 70, creating a low-pass signal and a high-pass signal from the original digital image channel. In this regard, the low-pass signal is then passed through a tone scale applicator 30. The high-pass signal is then added to the tone scaled low-pass signal with an adder 50.

Again referring to FIG. 6, there is also illustrated that the digital image signal is passed through a tone scale applicator 30. The signal output of this tone scale applicator 30 is applied to the (1−a(x)) input of the avoidance adder 130, to be described in detail below, to the sum resulting from the adder 50, which is applied to the (a(x)) input of the avoidance adder 130. After all of the image pixels have been processed in this manner, the array of pixels represented by the output of the avoidance adder 130 is a digital image channel with an adjusted tone scale retaining the original sharpness of the original image with minimal artifacts. This output image channel, when rendered to an output device by any method well known in the art, is visually similar to the output of the preferred embodiment.

An avoidance adder 130 requires three inputs: 2 signals to be summed, and the artifact avoidance signal (a(x)). The two signals to be summed undergo a transformation such that one of the signals to be summed is multiplied by (a(x)), and the other is multiplied by (1−a(x)). The two transformed signals are then added. The signal input which is scaled by (a(x)) is known as the "(a(x)) input" of the avoidance adder 130 and the signal input which is scaled by (1−a(x)) is known as the "(1−a(x))" input of the avoidance adder 130. If S1 and S2 are the signals to be summed with an avoidance adder 130, the result of which is A, the foregoing may be reduced to an algebraic expression:

$$A=(a(x))(S1)+(1-a(x))(S2)$$

Mathematics:

The final processed pixel of the preferred embodiment may also be represented in functional form:

$$t(x)=[x-[g(x)+a(x)h(x)]]+f(g(x)+a(x)h(x)) \quad (1)$$

Where:
　　x=the input image channel
　　t(x)=transformed digital image channel
　　g(x)=a low-pass filtered version of x
　　h(x)=a high-pass filtered version of x. i.e. h(x)=x−g(x)
　　f()=a tone scale function applied to either a digital image channel or image signal
　　a(x)=the artifact avoidance signal (the control signal)

The artifact avoidance signal a(x) is 1 for pixels in regions of the image which are generally flat (i.e. regions of the image where U.S. Pat. No. 5,012,333 does not produce artifacts.) The signal a(x) becomes 0 for pixels in regions of the image that contain high transition edges (i.e. regions of the image where U.S. Pat. No. 5,012,333 produces artifacts.) The signal a(x) may take on any value within the range of 0.0 to 1.0 depending upon the structure of the local region of the image.

At this point, it becomes useful to make several approximations. The first is that with the nearly linear tone scale functions which are common to image processing, $$g(f(x))=f(g(x)), \quad (2)$$

approximately.

Secondly, in the case where a tone scale f(x) is applied to a signal x, the result is approximately:

$$f(x)=f(g(x))+f'(g(x))*(h(x)) \quad (3)$$

Because of the nearly linear (slowly varying second derivative) nature of most tone scales, the application of a tone scale to an image signal is nearly equivalent to applying the tone scale to the low-pass of the original image channel, and scaling the high-pass of the original image channel by the slope of the tone scale function, evaluated at low-pass of the original image channel.

The third approximation follows directly from the first and second approximations.

$$f'(g(x))*(h(x))=h(f(x)) \quad (4)$$

Thus, if the equation summarizing the preferred embodiment is evaluated with the three approximations, the resulting approximation for the output pixel value in relatively flat regions (a(x)=1) becomes:

$$t(x)=f(g(x))+h(x)$$

This result implies that in relatively flat regions of the image, the detail signal of the processed pixel is equal to the detail signal of the original (h(x)), but the contrast of the low-pass signal has been modified by f(x). Likewise, when the equation is simplified with the assumption that the pixel to be processed is near a high transition edge (a(x)=0), $$t(x)=f(x)$$

This result implies that the processed version of the original pixels is only a function of the original pixel values and the tone scale function in regions near high transition edges. This result prevents the occurrence of artifacts at the edge regions.

For pixels with an intermediate value of a(x), (0<a(x)<1), the processed pixel will be bounded by f(x) and f(g(x))+h(x).

In summary, the method of the current invention allows a tone scale function to be applied to an image in such a way that the detail from the original image is preserved, except in those regions where preservation of the detail would produce unnatural artifacts. In these regions, the tone scale function is applied to the original pixel to produce the final output pixel.

Many other flow diagrams may be constructed which will produce a result that, when evaluated with the three approximations, will be:

$$t(x) = f(g(x)) + h(x) \quad \text{for } (a(x) = 1)$$

$$t(x) = f(x) \qquad\qquad \text{for } (a(x) = 0)$$

These alternative flow diagrams may appear quite different from the one described by the preferred embodiment, but utilize the same components of an avoidance signal, frequency decomposition by spatial filtering, and a tone scale function. The images processed with these various methods often contain small numerical differences (because of the approximations), but produce results that are visually comparable.

For example, the alternative embodiment shown in FIG. 6 may be written algebraically from the flow diagram as:

$$t(x)=(1-a(x))f(x)+a(x)[f(g(x)+h(x))]$$

This equation may be evaluated with a(x)=1.0 (i.e. flat regions of the digital image channel) and with a(x)=0 (i.e. edge regions of the image) by the three approximations (equations (2), (3), and (4)) to yield:

$$t(x) = f(g(x)) + h(x) \quad \text{for } (a(x) = 1)$$

$$t(x) = f(x) \quad \text{for } (a(x) = 0)$$

Thus, the alternative embodiment of the present invention is similar (within the limits of the mathematical approximations) to the preferred embodiment.

The invention has been described with reference to a preferred embodiment. However, it will be appreciated that variations and modifications can be effected by a person of ordinary skill in the art without departing from the scope of the invention.

What is claimed is:

1. A method for preserving detail when adjusting tone scale of a digital image channel, the method comprising:

(a) receiving a digital image channel;

(b) providing a tone scale function for adjusting a tone scale of the digital image channel;

(c) spatial filtering the digital image channel with a spatial filter which varies with location in the digital image channel according to the value of a control signal, thereby producing a space-variant spatial filtered version of the digital image channel; and (d) using the tone scale function, and the space-variant spatial filtered version of the digital image channel to produce an enhanced digital image channel.

2. The method as in claim 1 further comprising creating the control signal from a spatially filtered version of the digital image channel.

3. The method as in claim 2, wherein step (a) includes generating a high pass and low pass signal; wherein step (b) includes generating at least two non-linear spatial filtered versions of the digital image channel from the high pass signal, the low pass signal, the control signal, and the digital image channel.

4. The method as in claim 3, wherein step (a) includes generating an enhanced digital image channel by application of the tone scale function to one of the non-linear spatial filtered versions of the digital image channel, and wherein step (b) includes adding the remaining non-linear spatial filtered versions.

5. The method as in claim 3, wherein step (a) includes generating an enhanced digital image channel by application of the tone scale function to one of the non-linear spatial filtered signal versions of the digital image channel, and wherein step (b) includes modifying the remaining non-linear spatial filtered signals, and wherein step (c) includes adding the non-linear spatial filtered signals.

6. The method of claim 1, wherein step (a) includes receiving a luminance channel as the digital image channel.

7. The method of claim 1, wherein step (a) includes receiving either a red, green and blue channel as the digital image channel.

8. The method as in claim 7, wherein each of the red, green and blue channels are received steps (b)–(d) are performed on each of the red, green and blue color channels.

* * * * *